US011955745B2

(12) United States Patent
Miyamura

(10) Patent No.: US 11,955,745 B2
(45) Date of Patent: Apr. 9, 2024

(54) FEMALE CONNECTOR AND CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 232 days.

(21) Appl. No.: 17/612,128

(22) PCT Filed: May 11, 2020

(86) PCT No.: PCT/JP2020/018762
§ 371 (c)(1),
(2) Date: Nov. 17, 2021

(87) PCT Pub. No.: WO2020/241216
PCT Pub. Date: Dec. 3, 2020

(65) Prior Publication Data

US 2022/0224038 A1 Jul. 14, 2022

(30) Foreign Application Priority Data

May 29, 2019 (JP) ................................. 2019-100111

(51) Int. Cl.
*H01R 13/40* (2006.01)
*H01R 13/05* (2006.01)
(Continued)

(52) U.S. Cl.
CPC ......... *H01R 13/4361* (2013.01); *H01R 13/05* (2013.01); *H01R 13/11* (2013.01); *H01R 13/193* (2013.01); *H01R 13/2407* (2013.01)

(58) Field of Classification Search
CPC .............. H01R 13/4361; H01R 13/436; H01R 13/434; H01R 13/426; H01R 13/424;
(Continued)

(56) References Cited

U.S. PATENT DOCUMENTS 4,867,711 A * 9/1989 Yuasa ................ H01R 13/4362 439/744
4,867,712 A * 9/1989 Kato .................. H01R 13/4362 439/744
(Continued)

FOREIGN PATENT DOCUMENTS

JP 2002-280133 A 9/2002
JP 2015-232927 A 12/2015

OTHER PUBLICATIONS

International Search Report dated Aug. 4, 2020 for WO 2020/241216 A1 (4 pages).

*Primary Examiner* — Harshad C Patel
(74) *Attorney, Agent, or Firm* — Venjuris, P.C.

(57) ABSTRACT

It is aimed to realize space saving. A female connector includes female terminal fittings to be connected to male terminal fittings, a female housing for accommodating the female terminal fittings and a retainer displaceable between a terminal deformation position where the female terminal fittings are deformed and a release position where the retainer is separated from the female terminal fittings. The female terminal fitting includes a resilient contact piece for resiliently contacting the male terminal fitting. The retainer resiliently deforms the resilient contact pieces away from the male terminal fittings at the terminal deformation position.

8 Claims, 11 Drawing Sheets

(51) Int. Cl.
*H01R 13/11* (2006.01)
*H01R 13/193* (2006.01)
*H01R 13/24* (2006.01)
*H01R 13/436* (2006.01)

(58) Field of Classification Search
CPC .... H01R 13/4362; H01R 13/05; H01R 13/02; H01R 13/055; H01R 13/057; H01R 13/193; H01R 13/2407; H01R 13/40
See application file for complete search history.

(56) References Cited

U.S. PATENT DOCUMENTS

| | | | | | |
|---|---|---|---|---|---|
| 5,203,722 | A * | 4/1993 | Kinoshita | H01R 13/4362 439/752 |
| 5,252,096 | A * | 10/1993 | Okada | H01R 13/4362 439/752 |
| 5,464,356 | A * | 11/1995 | Nebeshima | H01R 13/4362 439/752 |
| 5,588,855 | A * | 12/1996 | Nankoh | H01R 13/4361 439/511 |
| 5,653,613 | A * | 8/1997 | Shimoda | H01R 13/4361 439/752 |
| 6,599,154 | B2 * | 7/2003 | Sakurai | H01R 13/4361 439/752 |
| 6,780,069 | B2 * | 8/2004 | Scherer | H01R 13/514 439/607.05 |
| 6,780,070 | B2 * | 8/2004 | Ishikawa | H01R 13/4362 439/752 |
| 6,935,904 | B2 * | 8/2005 | Ishiyama | H01R 13/432 439/744 |
| 7,850,471 | B2 * | 12/2010 | Imai | H01R 13/7032 200/51.1 |
| 9,379,472 | B2 * | 6/2016 | Hara | H01R 13/46 |
| 9,787,014 | B2 * | 10/2017 | Nagasawa | H01R 13/4362 |
| 9,923,297 | B2 * | 3/2018 | Sekino | H01R 13/4368 |
| 9,972,947 | B2 * | 5/2018 | Sekino | H01R 13/7031 |
| 10,224,671 | B2 * | 3/2019 | Sekino | H01R 13/28 |
| 10,622,746 | B2 * | 4/2020 | Abraham | H01R 13/4362 |
| 10,673,169 | B2 * | 6/2020 | Jabrane | H01R 13/6272 |
| 2002/0187678 | A1 | 12/2002 | Takahashi | |
| 2008/0009171 | A1 * | 1/2008 | Tsuji | H01R 13/6272 439/352 |

* cited by examiner

FEMALE CONNECTOR AND CONNECTOR

CROSS REFERENCE TO RELATED APPLICATIONS

This application is a national phase of PCT application No. PCT/JP2020/018762, filed on 11 May 2020, which claims priority from Japanese patent application No. 2019-100111, filed on 29 May 2019, all of which are incorporated herein by reference.

TECHNICAL FIELD

The present disclosure relates to a female connector and a connector.

BACKGROUND

Patent Document 1 discloses a connector including a female terminal mounted in a female housing and a male terminal mounted in a male housing. A resiliently deformable contact spring is accommodated in a box portion of the female terminal, and the male terminal includes a tab. If the female housing and the male housing are connected, the tab is inserted into the box portion to resiliently deform the contact spring. Thus, the female terminal and the male terminal are connected with a predetermined contact pressure by resilience due to a resilient restoring force of the contact spring.

PRIOR ART DOCUMENT

Patent Document

Patent Document 1: JP 2015-232927 A

SUMMARY OF THE INVENTION

Problems to be Solved

When the tab of the male terminal resiliently deforms the contact spring, friction resistance due to the resilient restoring force of the contact spring is generated. This friction resistance serves as connection resistance of the female housing and the male housing. The connection resistance increases as the numbers of the female terminals and the male terminals increase. As a countermeasure against this, a boost mechanism using a rotation-type lever is adopted in a multipole connector. However, if the rotation-type lever is used, there is a problem that the connector is enlarged by as much as the lever.

A connector of the present disclosure was completed on the basis of the above situation and aims to reduce a size of a structure for reducing connection resistance of a female housing and a male housing.

Means to Solve the Problem

A first aspect of the present disclosure is directed to a female connector with a female terminal fitting to be connected to a male terminal fitting, a female housing for accommodating the female terminal fitting, and an operating member displaceable between a terminal deformation position where the female terminal fitting is deformed and a release position where the operating member is separated from the female terminal fitting, wherein the female terminal fitting includes a resilient contact piece for resiliently contacting the male terminal fitting, and the operating member resiliently deforms the resilient contact piece away from the male terminal fitting at the terminal deformation position.

A second aspect of the present disclosure is directed to a connector with the female connector of the first aspect of the present disclosure, and a male housing for accommodating the male terminal fitting, the male housing being connected to the female housing, wherein the female housing includes a holding releasing portion for pushing a stopper from a hold position to a holding release position in a connection process of the male housing and the female housing.

Effect of the Invention

According to the present disclosure, it is possible to miniaturize a connector.

DETAILED DESCRIPTION TO EXECUTE THE INVENTION

Description of Embodiments of Present Disclosure

Figure 1:
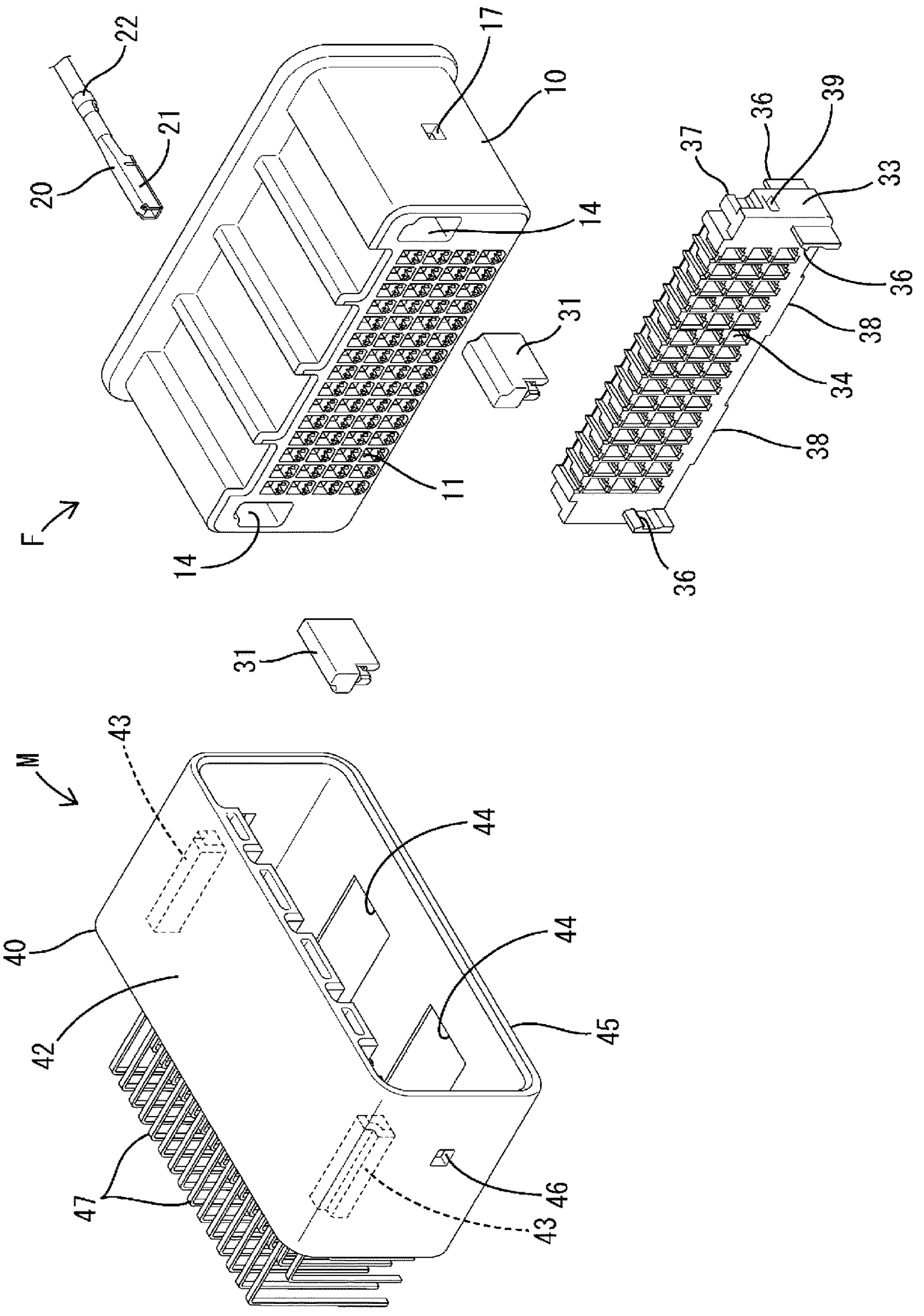
FIG. 1 is an exploded perspective view of a connector of a first embodiment.

First, embodiments of the present disclosure are listed and described.

(1) The female connector of the first aspect of the present disclosure includes a female terminal fitting to be connected to a male terminal fitting, a female housing for accommodating the female terminal fitting, and an operating member displaceable between a terminal deformation position where the female terminal fitting is deformed and a release position where the operating member is separated from the female terminal fitting, wherein the female terminal fitting includes a resilient contact piece for resiliently contacting the male terminal fitting, and the operating member resiliently deforms the resilient contact piece away from the male terminal fitting at the terminal deformation position.

According to the configuration of the first aspect of the present disclosure, in connecting the female terminal fitting and the male terminal fitting, the operating member is displaced to the terminal deformation position to resiliently deform the resilient contact piece away from the male terminal fitting. By so doing, in a connection process of the female terminal fitting and the male terminal fitting, the generation of sliding resistance between the male terminal fitting and the resilient contact piece can be avoided or sliding resistance generated between the male terminal fitting and the resilient contact piece can be reduced. After the female terminal fitting and the male terminal fitting are connected, the operating member is displaced to the release position to release the resilient contact piece from a resiliently deformed state. Then, the resilient contact piece resiliently contacts the male terminal fitting. Even if there are many female terminal fittings and male terminal fittings, the female connector of the first aspect of the present disclosure can connect the female terminal fittings and the male terminal fittings with a small operation force without using a boost mechanism by a lever. According to the female connector of the first aspect of the present disclosure, the lever is not necessary, wherefore miniaturization can be realized.

(2) Preferably, the resilient contact piece resiliently pushes the operating member in a direction to displace the operating member to the release position with the operating member held at the terminal deformation position, the female housing is provided with a stopper displaceable between a hold position where the operating member is held at the terminal deformation position and a holding release position where the stopper is separated from the operating member, and a displacement direction of the stopper from the hold position to the holding release position is a direction intersecting a displacement direction of the operating member from the terminal deformation position to the release position. The displacement direction of the stopper holding the operating member at the terminal deformation position is the direction intersecting the displacement direction of the operating member from the terminal deformation position to the release position. Therefore, there is no possibility that the stopper is surpassed by a pushing force of the resilient contact piece to displace the operating member to the release position.

(3) In (2), the female housing includes a partial locking portion, the operating member is held at a partial locking position where the female terminal fitting is allowed to be inserted into and withdrawn from the female housing by being locked by the partial locking portion, and the operating member contacts the stopper to restrict separation of the stopper from the female housing at the partial locking position. According to this configuration, a state where the stopper and the operating member are mounted in the female housing can be maintained.

(4) Preferably, the operating member includes a release position retaining portion for retaining the female terminal fitting inserted into the female housing when the operating member is displaced to the release position. In the female connector of the present disclosure, the operating member has both a function of resiliently deforming the resilient contact piece away from the male terminal fitting and a function of retaining the female terminal fitting. Thus, the number of components of the connector of the present disclosure is small as compared to the case where a member for moving the resilient contact piece away from the male terminal fitting and a member for retaining the female terminal fitting are separately prepared.

(5) Preferably, the operating member includes a terminal deformation position retaining portion for retaining the female terminal fitting inserted into the female housing when the operating member is displaced to the terminal deformation position. According to this configuration, a movement of the female terminal fitting in a withdrawing direction from the female housing can be prevented in the process of connecting the female terminal fitting and the male terminal fitting. In this way, the male terminal fitting and the female terminal fitting can be connected in a proper positional relationship.

(6) The connector of the second aspect of the present disclosure includes the female connector of the first aspect of the present disclosure, and a male housing for accommodating the male terminal fitting, the male housing being connected to the female housing, wherein the female housing includes a holding releasing portion for pushing the stopper from the hold position to the holding release position in a connection process of the male housing and the female housing. According to this configuration, if the stopper moves to the holding release position by being pushed by the holding releasing portion and is displaced to the holding release position in the connection process of the both housings, the operating member is displaced to the release position by being pushed by the resilient contact piece. Therefore, it is not necessary to perform an operation of moving the operating member to the release position separately from a connecting operation of the both housings.

(7) Preferably, the male housing includes a receptacle for surrounding the female housing, and the operating member is held at the release position by butting against an inner surface of the receptacle. Since the female housing needs not be formed with a part for holding the operating member at the release position, the complication of the shape of the female housing can be avoided.

(8) In (7), preferably, a stepped separation restricting portion is formed in the inner surface of the receptacle, and separation of the female housing from the receptacle is restricted by the operating member at the release position being hooked to the separation restricting portion. According to this configuration, since the separation of the female housing from the receptacle can be restricted by the hooking of the operating member and the separation restricting portion, the female housing and the male housing can be held in the connected state even if a large-scale locking structure is not provided.

DETAILS OF EMBODIMENTS OF PRESENT DISCLOSURE

First Embodiment

Figure 8:
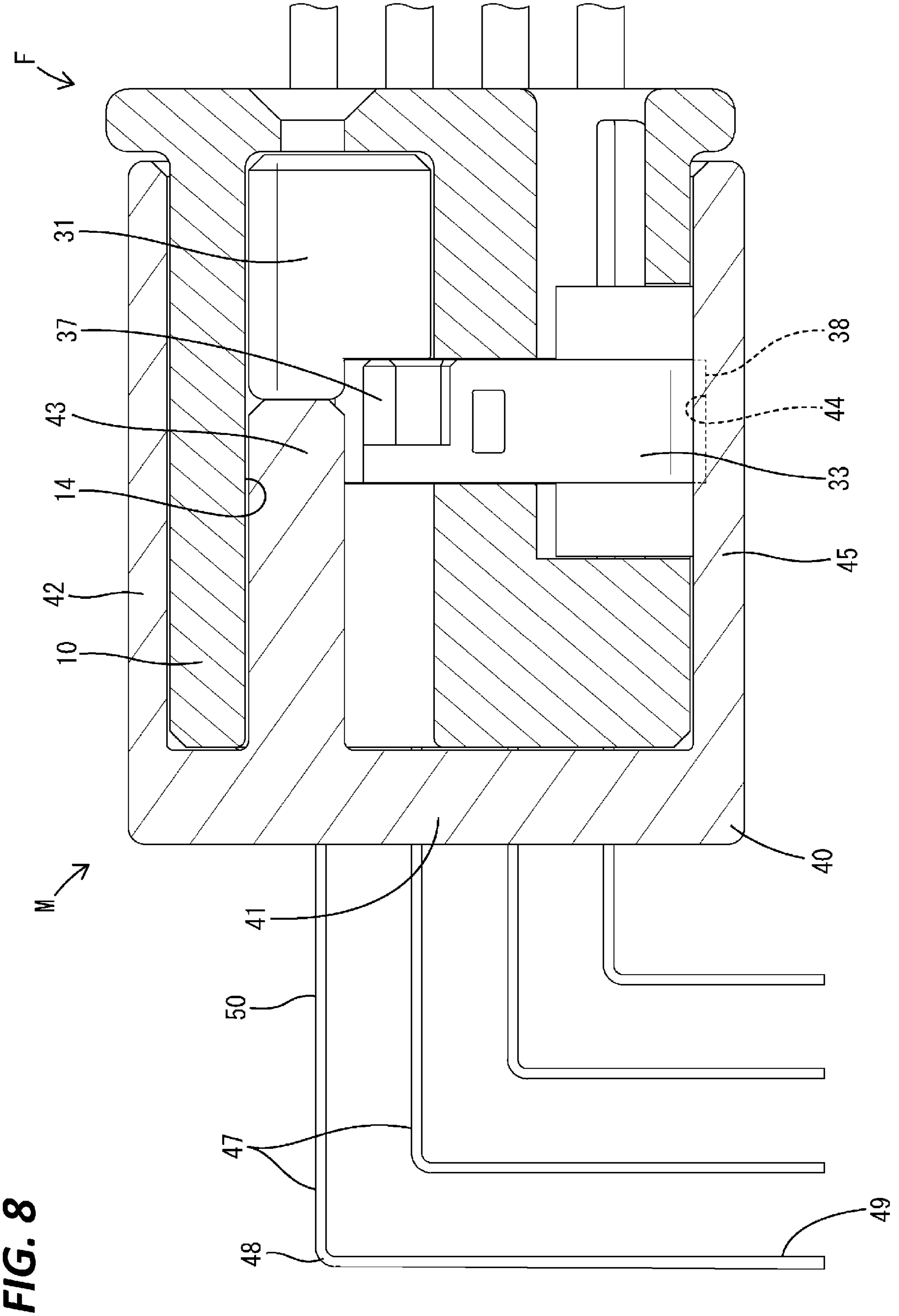
FIG. 8 is a side view in section showing a state where a female connector and a male connector are connected and the stopper is displaced to the holding release position.
Figure 9:
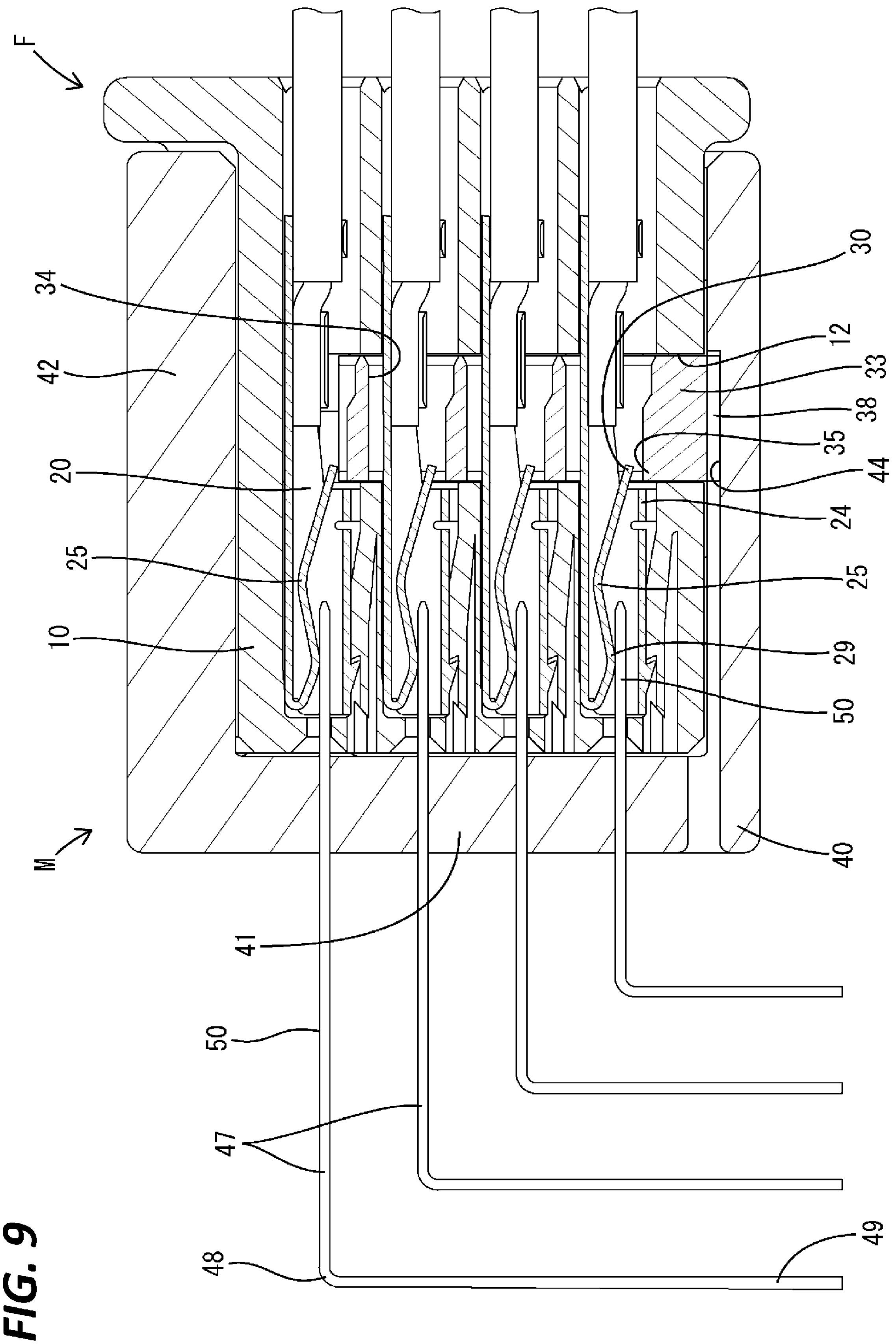
FIG. 9 is a side view in section showing a state where the female connector and the male connector are connected and the retainer is displaced to a release position.
Figure 10:
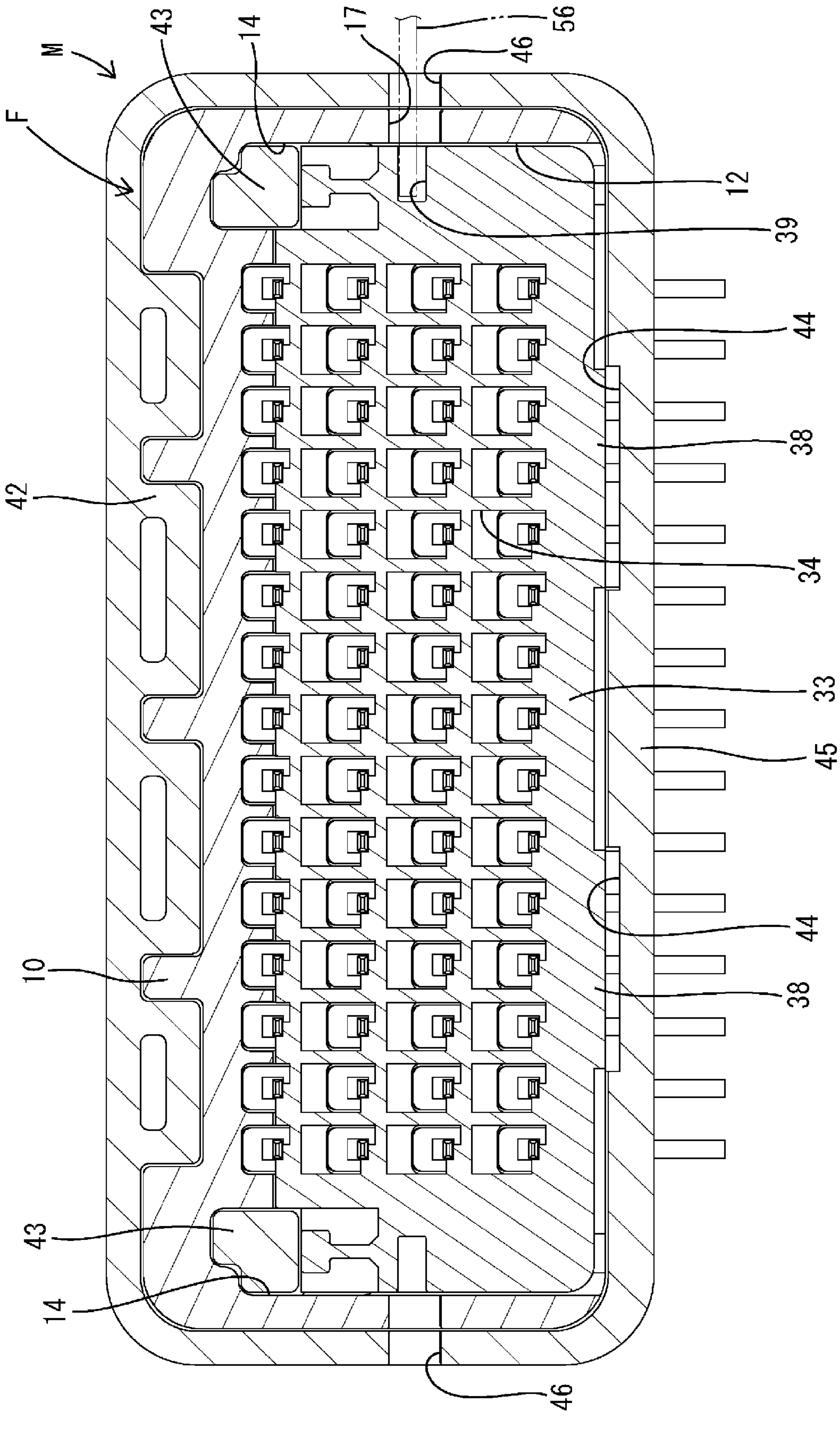
FIG. 10 is a side view in section showing a state where the female connector and the male connector are connected and the retainer is displaced from the release position to the terminal deformation position and separated from a separation restricting portion.

A first specific embodiment of a connector of the present disclosure is described with reference to FIGS. 1 to 10. In the first embodiment, a left side in FIGS. 3 to 9 is defined as a front side concerning a front-rear direction. Upper and lower sides shown in FIGS. 1 to 10 are directly defined as upper and lower sides concerning a vertical direction. Left and right sides shown in FIGS. 2 and 10 are directly defined as left and right sides concerning a lateral direction.

Figure 2:
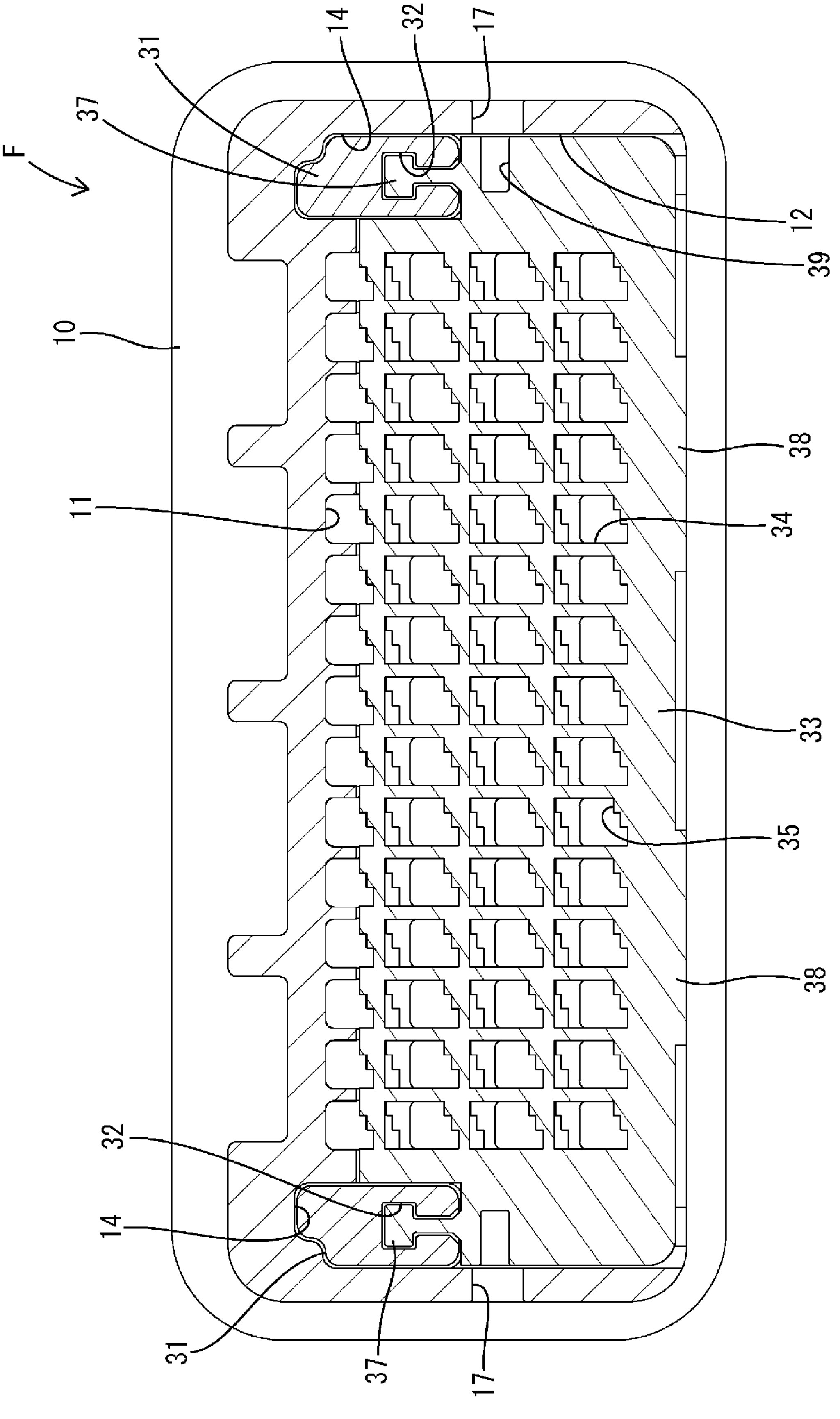
FIG. 2 is a front view in section showing a state where a retainer mounted in a female housing is held at a terminal deformation position by stoppers.

The connector of the first embodiment includes a female connector F and a male connector M connectable to/separable from each other as shown in FIG. 1. The female connector F includes a female housing 10, a plurality of female terminal fittings 20, a pair of left and right stoppers 31, and a retainer 33 (operating member as claimed).

Figure 3:
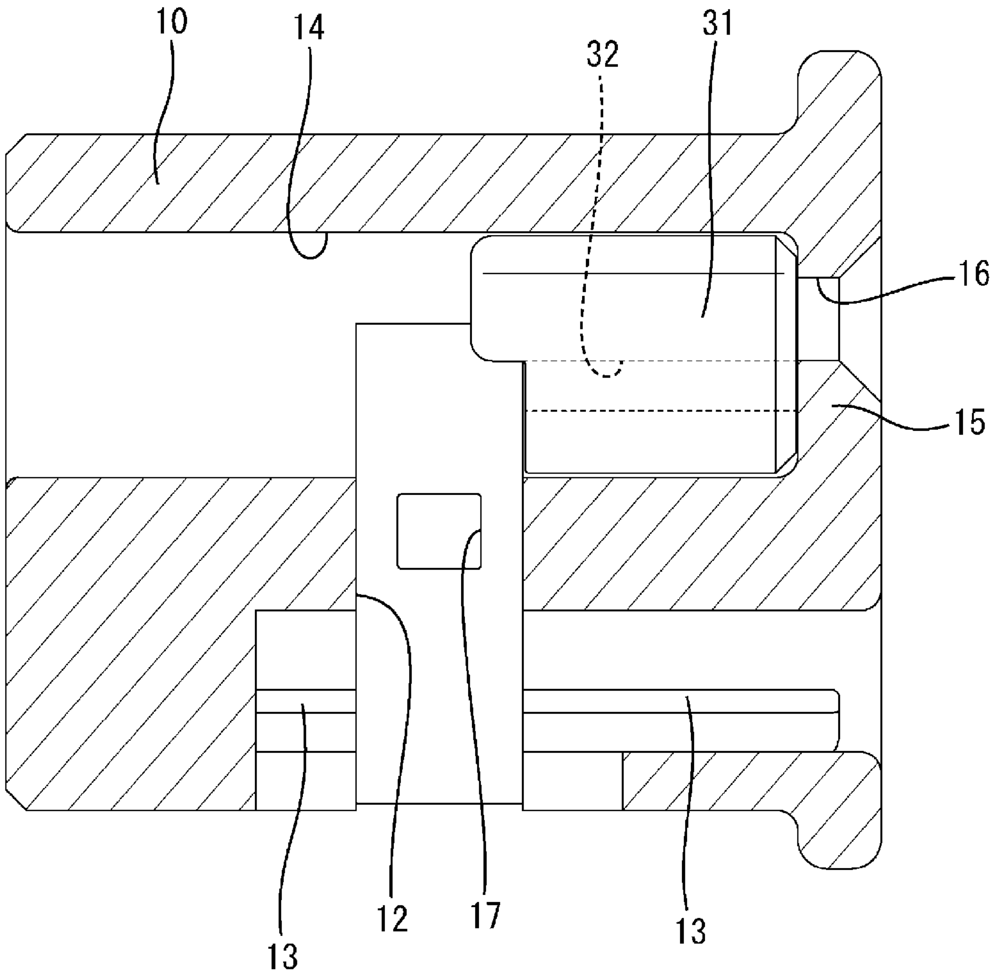
FIG. 3 is a side view in section showing a state where the stopper is mounted in the female housing.

The female housing 10 is made of synthetic resin. As shown in FIG. 2, the female housing 10 includes a plurality of terminal accommodation chambers 11 for accommodating the female terminal fittings 20. The terminal accommodation chamber 11 penetrates through the female housing 10 in the front-rear direction. The female housing 10 includes an accommodation space 12 for accommodating the retainer 33. The accommodation space 12 communicates with the plurality of terminal accommodation chambers 11 and is in form of a slit long in the lateral direction in the lower surface (outer surface) of the female housing 10. As shown in FIG. 3, two pairs of partial locking portions 13 spaced apart in the front-rear direction are formed in both left and right end parts of the accommodation space 12.

Figure 4:
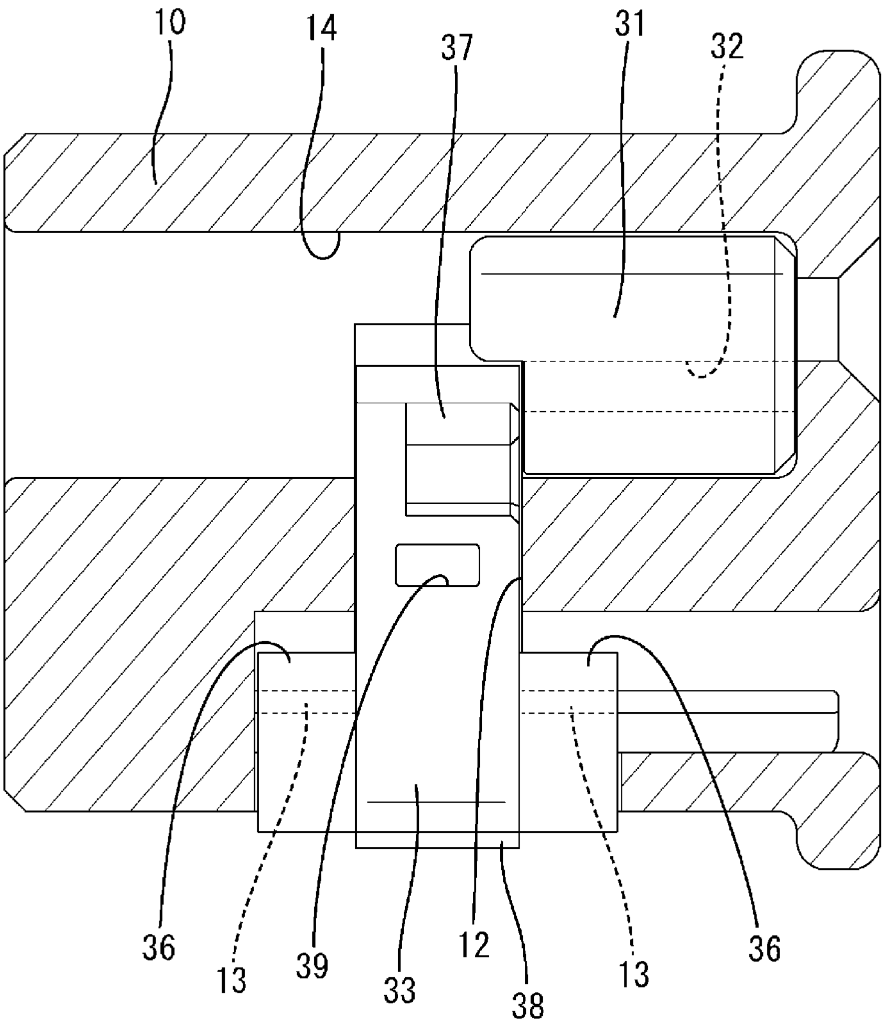
FIG. 4 is a side view in section showing a state where the stopper is held at a holding release position by the retainer.

As shown in FIGS. 1 and 2, the female housing 10 includes a pair of bilaterally symmetrical guide holes 14. As shown in FIGS. 3 and 4, the guide hole 14 extends in the front-rear direction and communicates with an upper end part of the accommodation space 12. The front end of the guide hole 14 is open in the front surface of the female housing 10. A rear end part of the guide hole 14 is closed by a rear wall portion 15 of the female housing 10. The female housing 10 includes a pair of left and right first jig insertion holes 16. The first jig insertion holes 16 penetrate in the front-rear direction through the rear wall portion 15 of the female housing 10 from the rear surface of the rear wall portion 15 to the guide holes 14. As shown in FIG. 2, the female housing 10 includes a pair of left and right second jig insertion holes 17. The second jig insertion holes 17 penetrate in the lateral direction through both left and right outer side walls of the female housing 10 from the outer side surfaces of the female housing 10 to the accommodation space 12.

Figure 5:
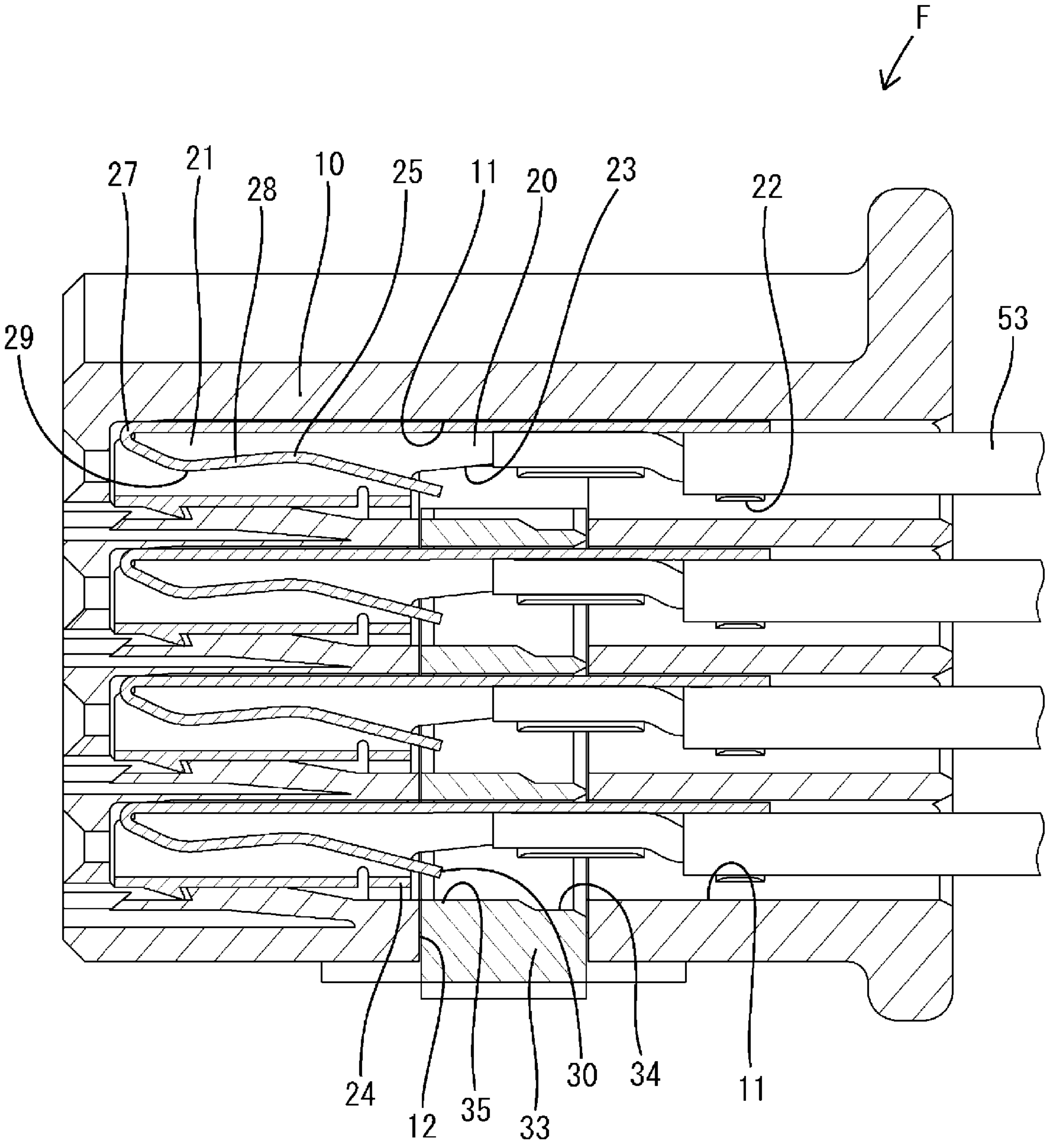
FIG. 5 is a side view in section showing a state where the retainer is held at partial locking position and female terminal fittings are inserted in the female housing.

As shown in FIG. 5, the female connector F includes the plurality of female terminal fittings 20. The female terminal fitting 20 has a shape elongated in the front-rear direction as a whole. A box portion 21 in the form of a rectangular tube is formed in a front end part of the female terminal fitting 20, and a crimping portion 22 in the form of an open barrel to be fixed to a front end part of a wire 53 is formed in a rear end of the female terminal fitting 20. The rear end of the box portion 21 and a front end part of the crimping portion 22 are connected via a coupling portion 23. A rear end part of the box portion 21 serves as a hooking portion 24 projecting downward in a stepped manner from a lower edge part of the coupling portion 23.

The female terminal fitting 20 includes a resilient contact piece 25. The resilient contact piece 25 is folded rearward along an arcuate path from the front end of a base plate portion 26 (upper plate portion) constituting the box portion 21 and extends rearward. The resilient contact piece 25 is resiliently displaceable in the vertical direction (direction toward/away from the base plate portion 26) with a folded portion 27 (front end part) linked to the base plate portion 26 as a fulcrum. The resilient contact piece 25 includes a curved portion 28. The curved portion 28 is shaped to project downward away from the base plate portion 26. A lower end part of the curved portion 28 serves as a contact point portion 29. The folded portion 27 and the curved portion 28 are accommodated in the box portion 21.

The resilient contact piece 25 includes a pressure receiving portion 30. The pressure receiving portion 30 is cantilevered obliquely to a lower-rear side from the rear end of the curved portion 28, and disposed in a rear end part of the resilient contact piece 25. A rear end part of the pressure receiving portion 30 projects rearward from the rear end (hooking portion 24) of the box portion 21. When the resilient contact piece 25 is in a free state without being resiliently deformed, the pressure receiving portion 30 is located below the coupling portion 23. If the pressure receiving portion 30 is pressed upward, the resilient contact piece 25 is resiliently displaced upward with the folded portion 27 as a fulcrum.

The stopper 31 is made of synthetic resin. As shown in FIGS. 3 and 4, the stopper 31 is inserted into the guide hole 14 from the front of the female housing 10. The stopper 31 is slidable in the front-rear direction in the guide hole 14. A moving direction of the stopper 31 is a direction parallel to a connecting direction of the female housing 10 and a male housing 40. The stopper 31 is formed with a holding recess 32. As shown in FIG. 2, the holding recess 32 has a T-shaped opening in the front surface of the stopper 31 and an I-shaped opening in the lower surface of the stopper 31.

The retainer 33 is made of synthetic resin. As shown in FIG. 1, the retainer 33 has a rectangular parallelepiped shape long in the lateral direction as a whole. As shown in FIG. 5, the retainer 33 is formed with a plurality of terminal insertion holes 34 penetrating through the retainer 33 in the front-rear direction. An upper edge part of the retainer 33 and lower edge parts of the respective terminal insertion holes 34 are formed with a plurality of retaining portions 35 (release position retaining portion and terminal deformation position retaining portion as claimed) corresponding to the respective terminal accommodation chambers 11. As shown in FIG. 1, the retainer 33 includes two pairs of partial locking claw portions 36. The two pairs of partial locking claw portions 36 are disposed on both left and right end parts of the retainer 33. The two pairs of partial locking claw portions 36 are disposed to sandwich holding projections 37 in the front-rear direction in a plan view.

As shown in FIG. 2, the retainer 33 includes a pair of bilaterally symmetrical holding projections 37. The pair of holding projections 37 are disposed on the both left and right end parts of the retainer 33. The holding projection 37 projects rearward from an upper end part of the retainer 33. The holding projection 37 is T-shaped in a back view. As shown in FIGS. 1 and 2, the retainer 33 includes a pair of left and right restricting projections 38. The pair of restricting projections 38 project slightly downward in a stepped manner from the outer surface (lower surface) of the retainer 33. The retainer 33 includes a pair of left and right jig recesses 39. The jig recesses 39 are formed by recessing both left and right outer side surfaces of the retainer 33.

As shown in FIG. 1, the male connector M includes the male housing 40 and a plurality of male terminal fittings 47. The male connector M has functions as a board connector to be mounted on a circuit board (not shown). The male housing 40 is made of synthetic resin. As shown in FIGS. 8 and 9, the male housing 40 includes a terminal holding portion 41 and a receptacle 42. The terminal holding portion 41 is in the form of a plate rectangular in a front view. The receptacle 42 is in the form of a rectangular tube projecting forward from the outer peripheral edge of the terminal holding portion 41.

The male housing 40 includes a pair of bilaterally symmetrical holding releasing portions 43. The pair of holding releasing portions 43 project forward from both left and right end parts of the front surface of the terminal holding portion 41 (back surface of the receptacle 42). A projecting direction of the holding releasing portions 43 is the same direction as the connecting direction of the male housing 40 to the female housing 10. The male housing 40 includes a pair of left and right separation restricting portions 44. The pair of separation restricting portions 44 are formed by shallowly recessing the inner surface of a lower plate portion 45 constituting the receptacle 42 in a stepped manner, and disposed while being spaced apart in the front-rear direction. The male housing 40 includes a pair of left and right third jig insertion holes 46. The pair of third jig insertion holes 46 penetrate through both left and right side wall portions constituting the receptacle 42 in the lateral direction.

As shown in FIGS. 8 and 9, the male terminal fitting 47 is made of a metal bar material and bent to be L-shaped in a side view. The male terminal fitting 47 includes a board connecting portion 49 extending downward from a bent portion 48 and a tab 50 extending forward from the bent portion 48. The male terminal fitting 47 is mounted into the male housing 40 with the tab 50 penetrating through the terminal holding portion 41 from behind the male housing 40. The board connecting portion 49 is exposed behind the male housing 40 and connected to the circuit board (not shown). The tab 50 is accommodated in the receptacle 42.

Next, an assembling procedure of the female connector F is described. First, the pair of stoppers 31 are inserted into the pair of guide holes 14 from the front of the female housing 10 (see FIG. 3). After the stoppers 31 are inserted to the innermost ends (rearmost ends) of the guide holes 14, the retainer 33 is mounted into the accommodation space 12 from below the female housing 10 as shown in FIG. 4. The retainer 33 mounted in the accommodation space 12 is held at a partial locking position (see FIGS. 4 and 5). The partial locking claw portions 36 of the retainer 33 are hooked to the partial locking portions 13 in the accommodation space 12 from above, whereby the separation of the retainer 33 from the female housing 10 is restricted.

With the retainer 33 held at the partial locking position, the holding recesses 32 and the holding projections 37 are vertically shifted in position. Thus, the lower end parts of the stoppers 31 butt against the upper end part of the retainer 33 from behind. By this butting, the stoppers 31 are held at innermost end positions (hereinafter, referred to as holding release positions) of the guide hole 14. The lower end part of the retainer 33 projects downward from the lower surface (outer surface) of the female housing 10. With the retainer 33 held at the partial locking position, the terminal insertion holes 34 correspond to the terminal accommodation chambers 11 and the retaining portions 35 are retracted downward from insertion paths of the female terminal fittings 20 into the terminal accommodation chambers 11 as shown in FIG. 5. In this state, the female terminal fitting 20 is inserted into the terminal accommodation chamber 11 from behind the female housing 10.

Figure 6:
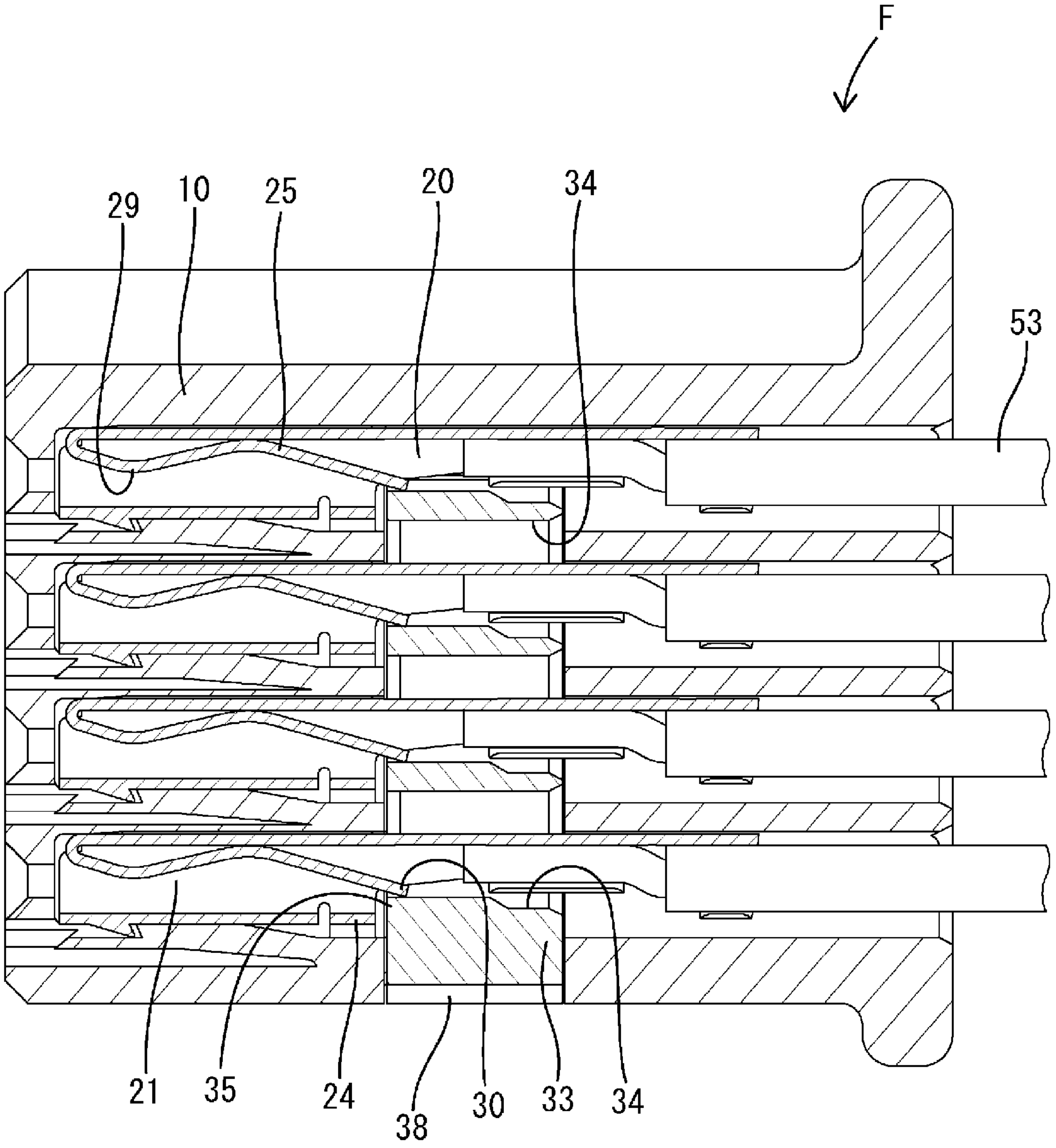
FIG. 6 is a side view in section showing a state where the retainer is displaced to the terminal deformation position.

After all the female terminal fittings 20 are inserted into the terminal accommodation chambers 11, the retainer 33 at the partial locking position is pushed upward and displaced to the terminal deformation position (full locking position). If the retainer 33 is displaced to the terminal deformation position, the retaining portions 35 of the retainer 33 are proximately facing the box portions 21 (hooking portions 24) of the female terminal fittings 20 from behind as shown in FIG. 6. Therefore, even if a rearward pulling force is applied to the female terminal fitting 20, the hooking portion 24 is hooked to the retaining portion 35, whereby the rearward withdrawal of the female terminal fitting 20 from the terminal accommodation chamber 11 can be prevented.

If the retainer 33 is displaced to the terminal deformation position, the retaining portions 35 of the retainer 33 push the pressure receiving portions 30 of the female terminal fittings 20 upward. In this way, the resilient contact pieces 25 are resiliently deformed to be retracted upward from insertion paths of the tabs 50 in the terminal accommodation chambers 11 (see FIG. 6). A displacement direction of the resilient contact pieces 25 at this time is a direction intersecting at a right angle to an inserting direction of the tabs 50 into the box portions 21 and is the same direction as a moving direction of the retainer 33 from the partial locking position to the terminal deformation position.

Note that if any one of the female terminal fittings 20 is incompletely inserted (incompletely inserted state), the box portion 21 of the female terminal fitting 20 in the incompletely inserted state is in the accommodation space 12. Accordingly, if an attempt is made to displace the retainer 33 at the partial locking position upward, the retaining portion 35 of the retainer 33 interferes with the rear end part (hooking portion 24) of the box portion 21 in the incompletely inserted state. Thus, the retainer 33 cannot be pushed up to the terminal deformation position. By restricting a movement of the retainer 33 in this way, the presence of the female terminal fitting 20 in the incompletely inserted state can be detected.

Figure 7:
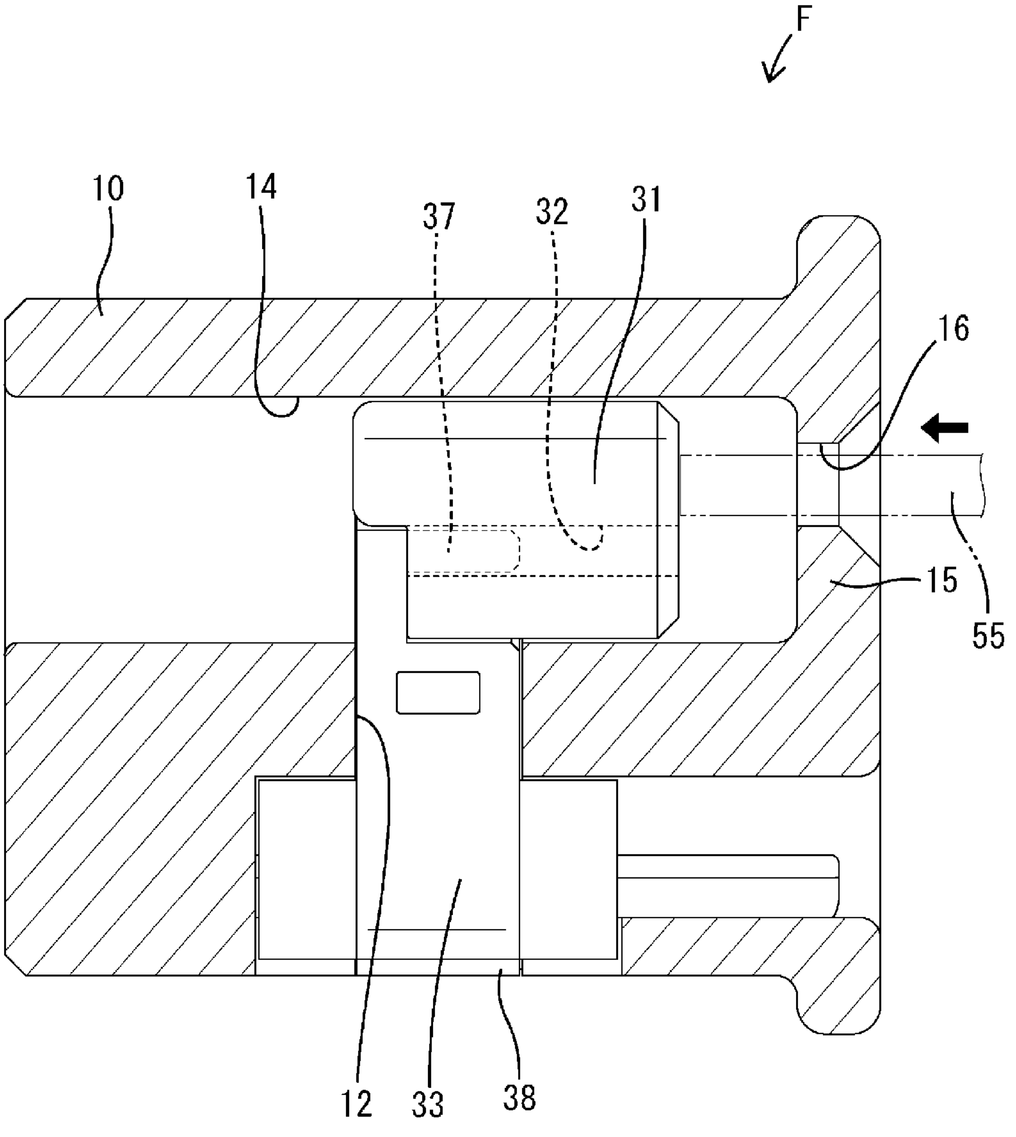
FIG. 7 is a side view in section showing a state where the stopper is displaced to a hold position and the retainer is held at the terminal deformation position.

With the retainer 33 displaced to the terminal deformation position, the holding projections 37 of the retainer 33 are opposed to the holding recesses 32 of the stoppers 31. After the retainer 33 is displaced to the terminal deformation position, a holding jig 55 is inserted into the first jig insertion hole 16 from behind the female housing 10 and the stopper 31 is pushed from behind by the holding jig 55 as shown in FIG. 7. The stopper 31 pushed by the holding jig 55 is slid from the holding release position to a hold position in front and, associated with this, the holding recess 32 is fit to the holding projection 37. By the fitting of the T-shaped holding recesses 32 and holding projections 37, the retainer 33 is restricted from moving toward the partial locking position and held at the terminal deformation position. With the retainer 33 held at the terminal deformation position, the entire retainer 33 is accommodated in the accommodation space 12 and the lower end part of the retainer 33 does not project from the outer surface of the female housing 10.

With a movement of the retainer 33 restricted by the stoppers 31, a downward pressing force due to resilient restoring forces of the plurality of resilient contact pieces 25 acts on the inner surfaces of the holding recesses 32 from the outer surfaces of the holding projections 37. A direction in which this pressing force is acting is a direction orthogonal to a sliding direction of the stoppers 31 from the hold position to the holding release position. Thus, even if the stoppers 31 are going to slide from the hold position to the holding release position located behind, movements of the stoppers 31 to the holding release position are restricted by friction resistance generated by the above pressing force. In this way, the retainer 33 is reliably held at the terminal deformation position. In the above way, the assembling of the female connector F is completed.

Next, a connection process and a separation process of the female connector F and the male connector M are described. At the time of connection, the female housing 10 is fit into the receptacle 42. In the connection process, the tabs 50 are inserted into the box portions 21 in the terminal accommodation chambers 11. The resilient contact pieces 25 (contact point portions 29) are not present in the insertion paths of the tabs 50 in the box portions 21. Accordingly, the tabs 50 and the resilient contact pieces 25 are kept out of contact until the both connectors F, M reach a properly connected state. Thus, friction resistance (connection resistance against the connection of the both connectors F, M) due to the slide contact of the tabs 50 and the resilient contact pieces 25 (contact point portions 29) is not generated.

In the connection process of the both connectors F, M, the holding releasing portions 43 enter the guide holes 14 of the female housing 10 and push the stoppers 31 at the hold position to the holding release position as shown in FIG. 8. During this time, friction resistance due to the resilient restoring forces of the resilient contact pieces 25 is generated between the stoppers 31 (inner surfaces of the holding recesses 32) and the retainer 33 (outer surfaces of the holding projections 37). This friction resistance becomes a resistance force against a connecting force for the connection of the both connectors F, M. However, since both the stoppers 31 and the retainer 33 are made of synthetic resin, the connection resistance between the stoppers 31 and the retainer 33 is smaller than the friction resistance (connection resistance) due to the slide contact of metals between the tabs 50 and the resilient contact pieces 25.

When the both connectors F, M reach the properly connected state, the stoppers 31 being pushed by the holding releasing portions 43 reach the holding release position (see FIG. 8). When the stoppers 31 reach the holding release position, the holding recesses 32 are disengaged from the holding projections 37. Thus, the retainer 33 is pushed downward (in a direction toward the partial locking position) by the pressing force due to the resilient restoring forces of the resilient contact pieces 25. When the lower surface of the retainer 33 butts against the lower plate portion 45 of the receptacle 42, a downward displacement of the retainer 33 is stopped.

A position where the retainer 33 butts against the receptacle 42 (see FIG. 9) is defined as a release position. The release position is set between the terminal deformation position and the partial locking position. With the retainer 33 displaced to the release position, the retaining portions 35 of the retainer 33 are located to overlap the box portions 21 in the vertical direction. That is, the retaining portions 35 and the hooking portions 24 of the female terminal fittings 20 are proximately opposed to each other. Thus, even if a rearward pulling force is applied to the female terminal fitting 20, the hooking portion 24 is hooked to the retaining portion 35 from front. Therefore, the separation of the female terminal fitting 20 from the female housing 10 is restricted.

A displacement direction of the retainer 33 toward the release position is a direction opposite to a pressing direction of the retaining portion 35 (retainer 33) to the pressure receiving portion 30 (resilient contact piece 25). Accordingly, in the process of displacing the retainer 33 to the release position, the amount of resilient deformation of the resilient contact pieces 25 decreases. Since the retaining portions 35 are completely disengaged from the pressure receiving portions 30 when the retainer 33 reaches the release position, the contact point portions 29 contact the tabs 50 to resiliently press the tabs 50 by the resilient restoring forces of the resilient contact pieces 25. In this way, the female terminal fittings 20 and the male terminal fittings 47 can be conductively connected with a predetermined contact pressure. In the above way, the connection of the both connectors F, M is completed.

With the both connectors F, M properly connected, static friction forces due to the resilient restoring forces of the resilient contact pieces 25 are generated between the resilient contact pieces 25 and the tabs 50. Thus, even if a pulling force is applied to the both connectors F, M in a separating direction, the both connectors F, M are held in the connected state by the static friction forces between the tabs 50 and the resilient contact pieces 25. Therefore, a lock arm for restricting the separation of the female housing 10 and the male housing 40 is unnecessary.

Further, with the retainer 33 displaced to the release position, the restricting projections 38 of the retainer 33 are fit in the separation restricting portions 44 of the receptacle 42 and the rear surfaces of the restricting projections 38 are facing the inner surfaces of the separation restricting portions 44 in the front-rear direction. Thus, even if the both housings 10, 40 are relatively displaced in the separating direction when a pulling force is applied to the both connectors F, M in the separating direction, the restricting projections 38 are hooked to the separation restricting portions 44 after the both housings 10, 40 are slightly relatively displaced. Therefore, the separation of the both connectors F, M is restricted.

In separating the both connectors F, M in the connected state, separating jigs 56 are inserted into the jig recesses 39 of the retainer 33 through the third and second jig insertion holes 46, 17 from both left and right sides of the male connector M as shown in FIG. 10. Then, by moving the separating jigs 56 upward, the retainer 33 is pushed up from the release position to the terminal deformation position against the resilience of the resilient contact pieces 25. In this state, the both connectors F, M are slightly relatively displaced to be separated and the rear end parts of the restricting projections 38 of the retainer 33 are placed at positions closer to the opening of the receptacle 42 than the separation restricting portions 44, out of the lower plate portion 45 of the receptacle 42.

Thereafter, the separating jigs 56 are pulled out from the jig recesses 39 and the second and third insertion holes 17, 46 and the both connectors F, M are separated. In the process of separating the both connectors F, M, sliding friction is generated between the restricting projections 38 and the lower wall portion. However, since both the restricting projections 38 and the lower plate portion 45 are made of synthetic resin, friction resistance against the separation does not become excessive.

The female connector F of the first embodiment includes the female terminal fittings 20 to be connected to the male terminal fittings 47, the female housing 10 for accommodating the female terminal fittings 20 and the retainer 33. The retainer 33 is displaceable between the terminal deformation position where the female terminal fittings 20 are deformed and the release position where the retainer 33 is separated from the female terminal fittings 20. The female terminal fitting 20 includes the resilient contact piece 25 for resiliently contacting the male terminal fitting 47.

The retainer 33 pushes the pressure receiving portions 30 of the resilient contact pieces 25 and resiliently deforms the resilient contact pieces 25 away from the tabs 50 of the male terminal fittings 47 at the terminal deformation position. With the retainer 33 held at the release position, the retainer 33 is separated from the resilient contact pieces 25 and the resilient contact pieces 25 resiliently return toward the insertion paths of the tabs 50.

According to this configuration, in connecting the both housings 10, 40 and connecting the female terminal fittings 20 and the male terminal fittings 47, the retainer 33 is displaced to the terminal deformation position to resiliently deform the resilient contact pieces 25 away from the male terminal fittings 47 (tabs 50). By so doing, in the process of connecting the female terminal fittings 20 and the male terminal fittings 47, the generation of sliding resistance between the male terminal fittings 47 (tabs 50) and the resilient contact pieces 25 can be avoided or sliding resistance generated between the male terminal fittings 47 (tabs 50) and the resilient contact pieces 25 can be reduced. After the female terminal fittings 20 and the male terminal fittings 47 are connected, the retainer 33 is displaced to the release position to release the resilient contact pieces 25 from a resiliently deformed state. Then, the resilient contact pieces 25 resiliently contact the tabs 50.

The connector of the first embodiment includes many female terminal fittings 20 and male terminal fittings 47. In connecting the female terminal fittings 20 and the male terminal fittings 47, the resilient contact pieces 25 are resiliently deformed to be retracted from the insertion paths of the male terminal fittings 47 (tabs 50) in advance. Accordingly, even without using a boost mechanism by a lever, the female terminal fittings 20 and the male terminal fittings 47 can be connected (the female connector F and the male connector M can be connected) with a small operation force. Since an installation space, a rotation space and the like of the lever are unnecessary according to the connector of the first embodiment, space saving can be realized.

The retainer 33 includes the retaining portions 35 (release position retaining portions) for retaining the female terminal fittings 20 inserted into the female housing 10 when the retainer 33 is displaced to the release position. That is, the retainer 33 has both a function of resiliently deforming the resilient contact pieces 25 away from the tabs 50 and a function of retaining the female terminal fittings 20. Therefore, the number of components of the connector of the first embodiment is small as compared to the case where a member for moving the resilient contact pieces 25 away from the tabs 50 and a member for retaining the female terminal fittings 20 are separately prepared.

The retainer 33 includes the retaining portions 35 (terminal deformation position retaining portions) for retaining the female terminal fittings 20 inserted into the female housing 10 when the retainer 33 is displaced to the terminal deformation position. According to this configuration, movements of the female terminal fittings 20 in a withdrawing direction from the female housing 10 can be prevented in the process of connecting the both housings 10, 40. In this way, the tabs 50 and the female terminal fittings 20 can be connected in a proper positional relationship.

With the retainer 33 held at the terminal deformation position, the retainer 33 is resiliently pushed in a direction to be displaced to the release position by the resilient restoring forces of the resilient contact pieces 25. The stoppers 31 are provided in the female housing 10 to restrict a displacement of the pushed retainer 33 to the release position. The stoppers 31 are displaceable between the hold position where the retainer 33 is held at the terminal deformation position and the holding release position where the stoppers 31 are separated from the retainer 33. A displacement direction of the stoppers 31 from the hold position to the holding release position is a direction intersecting at a right angle to the displacement direction of the retainer 33 from the terminal deformation position to the release position. Therefore, there is no possibility that the stoppers 31 are surpassed by the pressing forces of the resilient contact pieces 25 to displace the retainer 33 to the release position.

The female housing 10 includes the partial locking portions 13. The retainer 33 is held at the partial locking position where the insertion and withdrawal of the female terminal fittings 20 into and from the female housing 10 are allowed by being locked by the partial locking portions 13. At the partial locking position, the retainer 33 contacts the stoppers 31 to separate the stoppers 31 from the female housing 10. According to this configuration, a state where the stoppers 31 and the retainer 33 are mounted in the female housing 10 can be maintained, wherefore these are convenient to handle.

The connector of the first embodiment includes the female connector F and the male housing 40 for accommodating the male terminal fittings 47, the male housing 40 being connected to the female housing 10. The male housing 40 includes the holding releasing portions 43 for pushing the stoppers 31 from the hold position to the holding release position in the connection process of the male housing 40 and the female housing 10. According to this configuration, in the connection process of the male housing 40 and the female housing 10, if the stoppers 31 are pushed by the holding releasing portions 43 to move to the holding release position and be displaced to the holding release position, the retainer 33 is displaced to the release position by being pushed by the resilient contact pieces 25. Therefore, it is not necessary to perform an operation of moving the retainer 33 to the release position separately from a connecting operation of the both housings 10, 40.

The male housing 40 includes the receptacle 42 for surrounding the female housing 10 with the both connectors F, M connected. The retainer 33 is held at the release position by butting against the inner surface of the receptacle 42. According to this configuration, since the female housing 10 needs not be formed with a part for holding the retainer 33 at the release position, the complication of the shape of the female housing 10 can be avoided.

The stepped separation restricting portions 44 are formed in the inner surface of the receptacle 42. The retainer 33 at the release position is hooked to the separation restricting portions 44, whereby the separation of the female housing 10 from the receptacle 42 is restricted. According to this configuration, the separation of the female housing 10 from the receptacle 42 can be restricted by the hooking of the retainer 33 and the separation restricting portions 44. Thus, the female housing 10 and the male housing 40 can be held in the connected state even if a large-scale locking structure is not provided.

Second Embodiment

Figure 11:
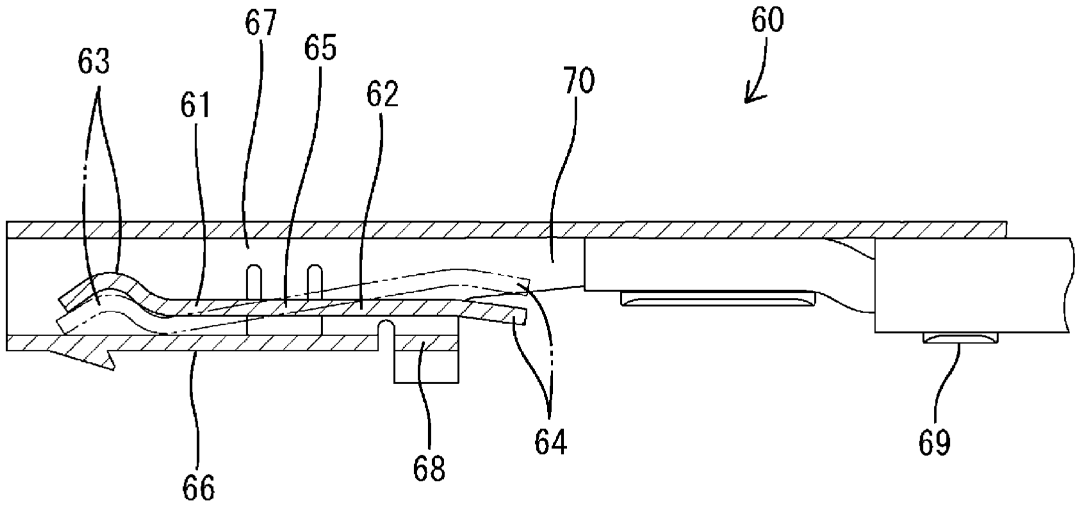
FIG. 11 is a side view in section of a female terminal fitting of a second embodiment.

A second specific embodiment of the present disclosure is described with reference to FIG. 11. The second embodiment is different from the first embodiment in the configuration of female terminal fittings 60. Since the other components are the same as in the first embodiment, the same components are denoted by the same reference signs and structures, functions and effects thereof are not described.

A resilient contact piece 61 formed in the female terminal fitting 60 of the second embodiment includes a base portion 62 extending straight in the front-rear direction, a contact point portion 63 connected to the front end of the base portion 62 and a pressure receiving portion 64 connected to the rear end of the base portion 62. The resilient contact piece 61 is supported in a box portion 66 at a fulcrum portion 65 in an intermediate part in the front-rear direction of the base portion 62. That is, out of both left and right side edges of the base portion 62, one side edge is connected to one side plate portion 67 constituting the box portion 66 via the fulcrum portion 65.

The contact point portion 63 has a curved shape to bulge more upward (in a direction entering an insertion path of a tab) than the base portion 62. A rear end part of the pressure receiving portion 64 projects rearward from the rear end (hooking portion 68) of the box portion 66. When the resilient contact piece 61 is in a free state without being resiliently deformed, the pressure receiving portion 64 is located below a coupling portion 70 coupling the box portion 66 and a crimping portion 69. If the pressure receiving portion 64 is pushed upward, the resilient contact piece 61 is resiliently deformed in a seesaw manner with the fulcrum portion 65 as a fulcrum and the contact point portion 63 is displaced downward, i.e. in a direction away from the insertion path of the tab 50 (not shown in FIG. 11) as shown by an imaginary line in FIG. 11.

Other Embodiments

The present invention is not limited to the above described and illustrated embodiments, but is represented by claims. The present invention is intended to include all changes in the scope of claims and in the meaning and scope of equivalents and include also embodiments as described below.

Although the tab is not in contact with the resilient contact piece with the resilient contact piece resiliently deformed by the operating member (retainer) in the above first embodiment, there is no limitation to this. With the resilient contact piece resiliently deformed by the operating member, a wiping effect may be obtained by the tab lightly contacting the resilient contact piece.

Although the operating member (retainer) has both the function of resiliently deforming the resilient contact pieces away from the tabs and the function of retaining the female terminal fittings in the above first embodiment, a member for moving the resilient contact pieces away from the tabs and a member for retaining the female terminal fittings may be separately prepared.

Although the female terminal fittings are retained by the operating member (retaining portions) with the resilient contact pieces resiliently deformed by the operating member (retainer) in the above first embodiment, the female terminal fittings may be retained by a member different from the operating member with the resilient contact pieces resiliently deformed by the operating member.

Although the separation of the stoppers from the female housing is prevented by the operating member at the partial locking position in the above first embodiment, the separation of the stoppers from the female housing may be restricted by the stoppers being hooked to the female housing.

Although the holding releasing portions of the male housing push the stoppers to the holding release position when the female housing and the male housing are connected in the first embodiment, the stoppers may be moved to the holding release position by a manual operation after the both housings are connected.

Although the operating member (retainer) is held at the release position by butting against the inner surface of the receptacle in the above first embodiment, a part for holding the operating member at the release position may be formed in the female housing, instead of this.

Although the separation restricting portions to which the operating member at the release position are hooked are formed in the inner surface of the receptacle in the above first embodiment, the inner surface of the receptacle may be shaped not to include the separation restricting portions.

Although the operating member is held at the terminal deformation position by the stoppers separate from the female housing in the above first embodiment, the operating member may be held at the terminal deformation position by being directly hooked to the female housing.

Although one retaining portion retains the female terminal fitting in the above first embodiment both when the retainer is at the release position and when the retainer is at the terminal deformation position, a part for retaining the female terminal fitting when the retainer is at the release position and a part for retaining the female terminal fitting when the retainer is at the terminal deformation position may be separately formed.

LIST OF REFERENCE NUMERALS

10 . . . female housing
11 . . . terminal accommodation chamber
12 . . . accommodation space
13 . . . partial locking portion
14 . . . guide hole
15 . . . rear wall portion
16 . . . first jig insertion hole
17 . . . second jig insertion hole
20 . . . female terminal fitting
21 . . . box portion
22 . . . crimping portion
23 . . . coupling portion
24 . . . hooking portion
25 . . . resilient contact piece
26 . . . base plate portion
27 . . . folded portion
28 . . . curved portion
29 . . . contact point portion
30 . . . pressure receiving portion
31 . . . stopper
32 . . . holding recess
33 . . . retainer (operating member)
34 . . . terminal insertion hole
35 . . . retaining portion (release position retaining portion, terminal deformation position retaining portion)
36 . . . partial locking claw portion
37 . . . holding projection
38 . . . restricting projection
39 . . . jig recess
40 . . . male housing
41 . . . terminal holding portion
42 . . . receptacle
43 . . . holding releasing portion
44 . . . separation restricting portion
45 . . . lower plate portion
46 . . . third jig insertion hole
47 . . . male terminal fitting
48 . . . bent portion
49 . . . board connecting portion
50 . . . tab
53 . . . wire
55 . . . holding jig
56 . . . separating jig
60 . . . female terminal fitting
61 . . . resilient contact piece
62 . . . base portion
63 . . . contact point portion
64 . . . pressure receiving portion
65 . . . fulcrum portion
66 . . . box portion
67 . . . side plate portion
68 . . . hooking portion
69 . . . crimping portion
70 . . . coupling portion
F female connector
M male connector

What is claimed is:

1. A female connector, comprising:

a female terminal fitting to be connected to a male terminal fitting;

a female housing for accommodating the female terminal fitting; and an operating member displaceable between a terminal deformation position where the female terminal fitting is deformed and a release position where the operating member is separated from the female terminal fitting, wherein:

the female terminal fitting includes a resilient contact piece for resiliently contacting the male terminal fitting, the operating member includes a holding projection disposed on an end part of the operating member and projecting rearward from the operating member, the female housing is provided with a stopper, the stopper being opposed to the holding projection when the operating member is displaced to the terminal deformation position, and the operating member resiliently deforms the resilient contact piece away from the male terminal fitting at the terminal deformation position.

2. The female connector of claim 1, wherein:

the resilient contact piece resiliently pushes the operating member in a direction to displace the operating member to the release position with the operating member held at the terminal deformation position, the stopper is displaceable between a hold position where the operating member is held at the terminal deformation position and a holding release position where the stopper is separated from the operating member, and a displacement direction of the stopper from the hold position to the holding release position is a direction intersecting a displacement direction of the operating member from the terminal deformation position to the release position.

3. The female connector of claim 2, wherein:

the female housing includes a partial locking portion, the operating member is held at a partial locking position where the female terminal fitting is allowed to be inserted into and withdrawn from the female housing by being locked by the partial locking portion, and the operating member contacts the stopper to restrict separation of the stopper from the female housing at the partial locking position.

4. The female connector of claim 1, wherein the operating member includes a release position retaining portion for retaining the female terminal fitting inserted into the female housing when the operating member is displaced to the release position.

5. The female connector of claim 1, wherein the operating member includes a terminal deformation position retaining portion for retaining the female terminal fitting inserted into the female housing when the operating member is displaced to the terminal deformation position.

6. A connector, comprising:

the female connector of claim 1; and a male housing for accommodating the male terminal fitting, the male housing being connected to the female housing, wherein the female housing includes a holding releasing portion for pushing a stopper from the hold position to the holding release position in a connection process of the male housing and the female housing.

7. The connector of claim 6, wherein:

the male housing includes a receptacle for surrounding the female housing, and the operating member is held at the release position by butting against an inner surface of the receptacle.

8. The connector of claim 7, wherein:

a stepped separation restricting portion is formed in the inner surface of the receptacle, and separation of the female housing from the receptacle is restricted by the operating member at the release position being hooked to the separation restricting portion.

* * * * *